US006668212B2

(12) United States Patent
Colangelo, III et al.

(10) Patent No.: US 6,668,212 B2
(45) Date of Patent: Dec. 23, 2003

(54) METHOD FOR IMPROVING TORQUE ACCURACY OF A DISCRETE ENERGY TOOL

(75) Inventors: Louis J. Colangelo, III, Bethelem, PA (US); Timothy R. Cooper, Titusville, NJ (US); John L. Linehan, Jamison, PA (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 64 days.

(21) Appl. No.: 09/883,470

(22) Filed: Jun. 18, 2001

(65) Prior Publication Data

US 2003/0009262 A1 Jan. 9, 2003

(51) Int. Cl.[7] .................................... G05B 15/00

(52) U.S. Cl. .................................... 700/275; 173/5

(58) Field of Search .................... 173/5, 6, 176, 173/178, 180, 181; 700/275, 282, 301; 702/145, 138; 73/862.21, 862.23

(56) References Cited

U.S. PATENT DOCUMENTS

| | | | | | |
|---|---|---|---|---|---|
| 4,864,903 | A | * | 9/1989 | Bickford et al. | 81/467 |
| 4,921,009 | A | | 5/1990 | Adam | |
| 5,117,919 | A | * | 6/1992 | Borries et al. | 173/1 |
| 5,154,242 | A | * | 10/1992 | Soshin et al. | 173/178 |
| 5,229,931 | A | | 7/1993 | Takeshima et al. | |
| 5,439,063 | A | | 8/1995 | Anders et al. | |
| 5,668,328 | A | * | 9/1997 | Steber et al. | 73/862.23 |
| 5,792,967 | A | * | 8/1998 | Steber et al. | 73/862.23 |
| 5,903,462 | A | | 5/1999 | Wagner et al. | |
| 5,937,370 | A | | 8/1999 | Lysaght | |
| 6,161,629 | A | | 12/2000 | Hohmann et al. | |
| 6,202,028 | B1 | * | 3/2001 | Crane et al. | 702/43 |
| 2002/0029092 | A1 | | 3/2002 | Gass | |
| 2002/0038159 | A1 | | 3/2002 | Gass | |

FOREIGN PATENT DOCUMENTS

| | | |
|---|---|---|
| DE | 3327964 | 2/1985 |
| DE | 19702544 | 8/1997 |
| DE | 19843151 | 4/2000 |
| DE | 19843162 | 4/2000 |
| DE | 19846947 | 4/2000 |
| DE | 19961374 | 6/2001 |
| DE | 20007904 | 10/2001 |
| EP | 0363587 | 4/1990 |
| EP | 0586811 | 3/1994 |
| EP | 1038638 | 9/2000 |
| EP | 1068931 | 1/2001 |
| WO | WO 98/22263 | 5/1998 |

OTHER PUBLICATIONS

International Search Report dated Sep. 25, 2002 received in International Application No. PCT/US 02/18800 (3 Pages).

U.S. patent application Ser. No. 09/686,375, Colangelo et al., pending.

* cited by examiner

*Primary Examiner*—Leo Picard
*Assistant Examiner*—Alexander Kosowski
(74) *Attorney, Agent, or Firm*—Michael Best & Friedrich LLP

(57) ABSTRACT

A method for improving the accuracy and repeatability of torque applied by discrete energy tools subjected to a wide variety of joint conditions. The method includes relating air pressure to output torque and compensating for temperature and aging variations. Additionally, the method may include a process for detecting previously tightened fasteners.

17 Claims, 4 Drawing Sheets

METHOD FOR IMPROVING TORQUE ACCURACY OF A DISCRETE ENERGY TOOL

This application claims priority to U.S. application Ser. No. 09/686,375, filed on Oct. 11, 2000.

FIELD OF THE INVENTION

The present invention relates to tools for threaded fasteners generally, and more specifically to a method for applying a predetermined torque to a threaded fastener.

DESCRIPTION OF THE RELATED ART

Threaded fasteners are commonly tightened with impact tools. An example of a field in which impact tools are used extensively is the automotive service market, in which impact tools are used for the reapplication of automotive wheels. Although impact tools are not designed to accurately control torque, many tire shops use impact tools as the primary means to re-apply lug nuts when mounting tires on automobiles. The current best practice in the industry includes re-applying the wheel lug nuts with an impact tool that has a torque stick attached to the output shaft and then hand tightening the nut 130 (see FIG. 1) with a hand torque wrench to verify torque. Torque sticks are designed to limit the maximum torque that an impact tool can apply to a nut 130, however, the actual torque achieved is determined by the impact wrench, air pressure, joint stiffness, and joint condition. Torque sticks only limit the torque applied; they do not allow the operator to specify a target torque, and there is no verification of the final joint torque. The two-step process of using an impact tool and then a torque wrench is also time consuming.

Tire shops have many different policies and procedures in place to attempt to improve quality, however, all the procedures rely heavily on the operator's skill and consistency in performing the required steps. It is difficult for the tire shops to enforce their policies one hundred percent of the time, because a mechanic can complete the job using other available tools without following the proper procedure, and without applying the correct torque. Over or under tightening lug nuts can damage the wheel, hub and brake assembly. Damage to the wheel components can impact safety. Improperly tightened wheel lug nuts can potentially cause wheel separation.

Automobile manufactures publish very specific torque requirements for re-applying wheels to vehicles. Although tire shops may attempt to meet these specifications, their policies and procedures may not ensure detection of situations in which the lug nuts are tightened to an improper torque or not tightened at all. Several commercially available systems attempt to control the torque output of either an impact tool or a pulse tool.

SUMMARY OF THE INVENTION

The present invention provides a method of controlling an air driven tool to provide greater torque accuracy. The method comprises the steps of: establishing an air pressure profile for a plurality of torque values; determining a calibration factor for the tool; multiplying the desired torque by the calibration factor to determine a calibrated torque value; and supplying the tool with air at the air pressure profile corresponding to the calibrated torque value. The method may further include an improved technique for detecting previously tightened fasteners.

DETAILED DESCRIPTION

The present invention provides a method of improving torque accuracy of a discrete energy tool. The method relates supply air pressure to output torque and includes compensation for temperature and aging variations. The preferred method also provides improved detection of previously tightened fasteners.

The methods of the present invention can be utilized with any of a number of controllers designed to control discrete energy tools. The present invention is described below in use with an exemplary complete torque management system (the exemplary torque management system is described in detail in co-pending U.S. patent application Ser. No. 09/686,375 which is incorporated herein by reference), however, the methods of the present invention can be utilized with other control systems for discrete energy tools and are not intended to be limited to the specific control system described below.

The exemplary torque management system 100 includes: a regulator that limits an amount of power supplied to a tool, a tool that contains a torque transducer on the output shaft to monitor the actual torque applied to the fastener, a solenoid valve to stop the air supply to the tool when the desired torque is reached, and a controller that controls all the functions of the system. In addition to these main system components the system also contains a pressure transducer to monitor the air pressure supplied to the tool and a lubricator sensor to verify that lubricant is being supplied to the tool. The software in the system contains a "snugging" feature that requires that the operator tighten all the fasteners to a torque value lower than the final torque to insure that the wheel and hub have been properly aligned. At least one controller controls the regulator so as to limit an amount of power to the tool to apply a predetermined torque to each of a plurality of fasteners sequentially. A processor, separate and distinct from the controller, stores data including an identification of the plurality of fasteners and the predetermined torque to be applied to the fasteners by the tool. The processor provides the data to the at least one controller. All the components in the system work together to verify that the desired tightening process has been used.

It will be understood that many of the individual components (such as, for example, regulators, valves, pulse tools) of this system have been used separately in other torque control applications for many years. A detailed description of these prior art components is not provided herein, but is understood by one of ordinary skill in the art.

Figure 1:
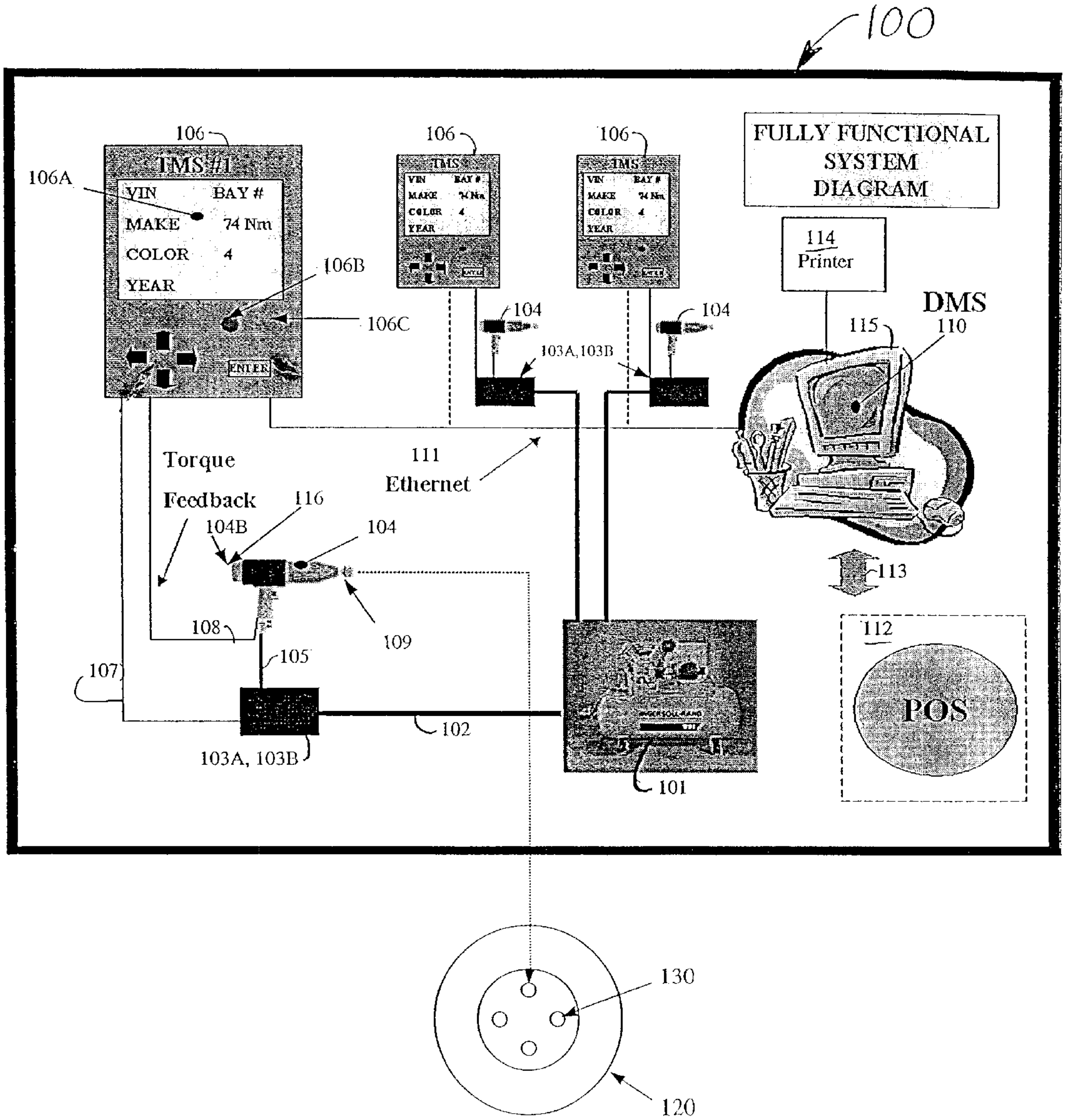
FIG. 1 is a block diagram of an exemplary system utilizing the methods according to the present invention.

FIG. 1 shows a hardware diagram for the exemplary torque control system 100. The two major components of the exemplary control system 100 are:

(1) A Data Management System (DMS) 110 which controls the entry of work order information; and (2) One or more Torque Management Systems (TMS) 106, each of which controls the flow of air to a corresponding tool 104 and monitors the torque being applied by the tool.

In addition to the DMS 110 and TMS 106, the system may include a discrete energy tool 104 or similar type of tool an air supply 101, and Air Control System (ACS), which includes a regulator 103*a* and an electronically controlled solenoid 103*b*.

The system 100 contains a standard shop air compressor 101 that is connected by standard shop air plumbing 102 to an electro-pneumatic regulator 103*a* that is connected to an electrically controlled solenoid 103*b*. The electro-pneumatic regulator 103*a* and solenoid 103*b* are connected to a discrete energy tool 104 through a pneumatic hose 105. The electro-pneumatic regulator 103*a* and solenoid 103*b* are also connected to the Torque Management System (TMS) 106 by an electrical cable 107. The TMS 106 controls the air pressure in the system 100 by varying the current signal to the electro-pneumatic regulator 103*a*. The TMS 106 is connected to a discrete energy tool 104 by an electrical cable 108. The electrical cable 108 is connected to strain gages 109 that are applied to the output shaft of the tool. The TMS 106 is connected to the Data Management System (DMS) 110 by an "Ethernet™" cable 111. The DMS 110 can then be connected into the shop point of sale (POS) system 112 by an "Ethernet™" cable 113 or the like. The DMS is also connected to a printer 114 by a serial or parallel printer cable 115. The electrical control wire on each tool is also fitted with a "smart chip" 116 (memory chip that contains: tool serial number, calibration number, maintenance history, temperature measurement, and a running total of the number of cycles run with the tool since the last calibration). The system can accommodate either a single TMS unit controlled by one DMS, or multiple TMS units controlled by one DMS.

The exemplary Data Management System 110 is embodied in a programmed personal computer that has a display (which may be a VGA or SVGA or the like), keyboard, hard drive and a pointing device (e.g., a mouse, track ball, stylus, etc.). The exemplary DMS 110 has a user interface, which is a custom Windows™ based application program that allows the shop supervisor to enter information for a specific job, which may include, for example, mounting two of the four tires on a given automobile. The DMS 110 also contains a data file that contains the manufacturing torque specifications and number of wheel lug nuts 130 for most makes and models of automobiles.

The exemplary Torque Management System 106 is embodied in an electronic logic controller or control box that controls the flow of air to the tool by electrically controlling an electro-pneumatic regulator 103*a* and a solenoid valve 103*b*. The TMS 106 also monitors the torque being applied to the joint by evaluating the signal from the strain gage 109 on the output shaft of the tool 104. The exemplary TMS 106 contains an "enter" key and "cursor" keys that allow the operator to toggle through a plurality of work orders sent to the controller from the DMS 110. The TMS 106 contains a display, such as a 3 VGA screen 106*a*, to view textual and graphical output and other indicators (such as, for example, red and green LED lights 106*b* and 106*c*) to indicate successful tightening operations, as well as fastening errors.

Preferably, the TMS 106 is wired to the desired tool 104 through cable 108. The connection is used to drive and/or communicate with a signal horn 104*b*, the torque transducer 109, the calibration device memory 116, and an ambient temperature sensor contained in the memory chip 116. A single device, memory chip 116, can provide both the memory and temperature sensing functions. For example, a DS1624 Digital Thermometer and Memory device by Dallas Semiconductor of Dallas, Tex. may be used. Alternatively, a memory and a separate temperature sensor may be provided.

The TMS 106 is also wired to the air control system, regulator 103*a*, solenoid 103*b* and the pressure transducer (not shown) located inside the regulator through cable 107.

Preferably, the TMS 106 tracks the tool temperature through memory/temperature sensor 116, and alters the torque algorithm used to achieve accurate torque control based on the temperature. Also, if the temperature falls outside of the tool's operating limits for accurate torque control, TMS 106 can prevent the tool 104 from operating.

Snugging:

Testing has determined that overall wheel 120 joint integrity is improved if the lug nuts 130 are "snugged" (pre-torqued to a very low torque setting) before the final tightening is completed. Snugging allows the wheel, hub and lug nuts 130 to align in the optimal location, minimizing stresses that are developed when all of the mechanical parts try to center themselves while one or more of the lug nuts 130 have already been fully tightened to the final torque value. To implement the snug feature, the TMS 106 sets the air pressure to a very low value. Each lug nut 130 is torqued to a low value (approximately 10 to 40 ft-lb).

Final Tightening:

After snugging, the operator is ready to complete the final tightening of each lug nut 130. The operator squeezes the trigger and the tool 104 begins to run. The tool 104 continues to run until the desired torque is achieved or until an error occurs. Exemplary errors include:

Over torque/Under torque: when the actual torque measured deviates from the target torque range by more than an acceptable predetermined percent, for example, +/−15% of the target torque.

Slow error: when the desired torque is not achieved within a preset number of impacts. This type of error can occur if the threads on the lug nut 130 or stud are stripped.

Fast error: when the desired torque, or a predetermined percentage thereof, is achieved too quickly, the system assumes that the lug that was just tightened was previously tightened to the desired torque. This feature prevents some lugs from being tightened more than once while others would not be tightened at all.

System Diagnostics:

Several system parameters are monitored to insure that the overall system is functioning properly. A pressure sensor is included in the system to monitor supply air pressure. If the target pressure drops below the predetermined value, the unit does not work.

The TMS 106 monitors the condition of the strain gages 109 to determine if they are functioning within an acceptable range. The TMS 106 zeroes the strain gages 109 before each run to improve torque accuracy.

Torque accuracy may also be affected by tool characteristics, the amount of tool usage and the tool temperature. For example, tool characteristics related to manufacturing tolerances and allowable variations in assembly and lubrication or tool age may cause the torque output to vary slightly from tool to tool even with the same supplied air pressure profile. Additionally, within a given tool, the tool usage or temperature may cause the tool to apply a different maximum torque at different times even with the same supplied air pressure profile. To compensate for these differences, the preferred method of the present invention incorporates scaling or calibration factors related to the tool characteristics and usage ($C_A$) and the tool temperature ($C_T$).

The preferred method of calibration generally includes a comparison of the tool's actual output torque at a regulated pressure on a controlled calibration joint to the torque expected under these conditions. The calibration joint may be, for example, a piece of hex stock welded to a bar or plate that is rigidly affixed to a suitable rigid structure. Initially, testing is performed on a laboratory standard tool, i.e. a tool for which the air pressure profiles are optimal. The standard tool is run on the calibration joint at a variety of temperatures and pressures and one of the test pressures and temperatures are selected as the nominal pressure ($P_{NOM}$) and the nominal temperature ($Temp_{NOM}$). Once the $P_{NOM}$ and $Temp_{NOM}$ are selected, the standard tool is run on the controlled joint to determine a nominal torque ($T_{NOM}$).

To calibrate a given tool 104, the tool 104 is run on the calibration joint at the $P_{NOM}$. Since torque typically varies with tool temperature, the tool temperature is recorded at the time of the calibration run. The relationship between torque and temperature at the fixed $P_{NOM}$ is represented mathematically by a polynomial equation that is fit to lab data. That is, the expected torque ($T_{EXP}$) on the calibration joint at the $P_{NOM}$ may be expressed as follows:

$$T_{EXP}=A_0+A_1*\text{temperature}+A_2*\text{temperature}^2+A_3*\text{temperature}^3$$

The A's are coefficients that are found, for instance, by using a least squares fit to the laboratory data. For example, in a lab test using a lab standard tool manufactured by Yokota Industries under model no. YEX-1900 at a $P_{NOM}$ of 70 psi with a resultant $T_{NOM}$ of 108.6 ft. lbs., the coefficients had the following values:

$A_0$=6.766E1

$A_1$=1.537E0

$A_2$=−1.813E−2

$A_3$=6.462E−5

To determine the age calibration factor $C_A$, the tool 104 is run on the calibration joint for a fixed time or a fixed number of blows and the peaks of the torque blows are averaged across the total number of blows. These peaks may or may not be filtered to attenuate signals above a corner frequency. In practice, several runs may be made to ensure that the tool 104 is operating smoothly, with data only averaged during the final run. The average peak torque value found during the calibration process is referred to as the measured torque ($T_{MEA}$). The age calibration factor $C_A$ is determined by dividing the $T_{EXP}$ given the current temperature by that obtained from the calibration run $T_{MEA}$, i.e., $C_A=T_{EXP}/T_{MEA}$. The $T_{NOM}$ and $P_{NOM}$, as well as the A coefficients, are preferably stored in the DMS 110 or otherwise within the given control system and provided to each TMS 106 or control unit. The TMS 106 is preferably configured to automatically set the tool pressure to $P_{NOM}$ during the calibration process.

The age calibration process may be performed at any desired interval. For example, the system can be configured to require the age calibration process to be performed at the beginning of each day. Alternatively, the system can be configured to require the age calibration process to be performed after a predetermined number of cycles of the tool. In either configuration, the number of cycles on each tool 104 is preferably monitored through the use of a "smart chip" 116 on each tool and recommendations on tool maintenance are supplied to the operator. The calibration data and current number of cycles run since last calibration are stored in the memory device 116. This data is continuously uploaded to the TMS 106 while the tool 104 is connected to the TMS. After each work order (car) is complete, TMS 106 updates the data in the chip 116 to maintain the total number of cycles. TMS 106 may be programmed to prevent operation of the tool 104 if the calibration is out of date. Because the calibration data is stored on the tool 104, the tool can be shared between more than one TMS 106. The TMS 106 to which the tool 104 is connected at any given time can determine whether a new calibration is needed. Further, the service record for the tool may also be stored in the memory device 116 which may also be equipped with a temperature sensor.

With respect to the temperature calibration, the TMS 106 routinely tracks the tool temperature through a temperature sensor 116, and determines the temperature calibration factor $C_T$ to calibrate the torque algorithm used to achieve accurate torque control based on the temperature. Preferably, the $C_T$ is calculated periodically, for example, every 5 minutes, based on a rolling average temperature, i.e., the temperature is recorded every five minutes, and the average of the last six temperatures ($Temp_{AVG\ CURRENT}$) is utilized to perform the current $C_T$ calculation. The $Temp_{AVG\ CURRENT}$ is utilized in the formula set forth above to determine the current expected torque ($T_{EXP\ CURRENT}$). The $C_T$ is then calculated by dividing the nominal torque by the current expected torque, i.e., $C_T=T_{NOM}/T_{EXP\ CURRENT}$.

The actual goal torque is multiplied by the product of $C_A$ times $C_T$ to obtain a modified, or shifted goal torque. This shifted torque is used in selecting the appropriate air pressure profile, as explained below, thus compensating for the variation in tool performance.

Additionally, the tool temperature sensor can be utilized to ensure the tool temperature does not fall outside of the tool's operating limits for accurate torque control. If such occurs, the TMS 106 can prevent the tool 104 from operating.

The TMS 106 also monitors the oil level in the inline lubricator to insure that the tool is lubricated according to design recommendations. If the lubricator does not contain oil an error indicator can be displayed on the TMS screen and operation of the tool can be prevented.

Specific system operation of the exemplary tool management system is set forth in detail in co-pending U.S. patent application Ser. No. 09/686,375 which is incorporated herein be reference.

Pressure Profile

For any discrete energy tool, the maximum amount of torque that can be delivered to the joint is primarily controlled by four parameters. One of these parameters is the overall inertia of the rotating mechanism and another is the compliance of the clutching means that, when in contact with the threaded joint, acts to negatively accelerate the rotating inertia. The third is the air pressure that is used to drive the air motor. The fourth is the stiffness of the joint components themselves, both the clamped parts and the nut and bolt or screw. The combination of these four parameters determines the maximum torque that the tool can achieve. The stiffness of the clamped parts is generally fixed and it is difficult and impractical to greatly vary the inertia or output compliance of the tool based on the desired output torque. It is easiest to adjust the air pressure delivered to the tool during the tightening cycle to more accurately achieve the desired torque, however, simple variations in pressure do not provide optimal tightening performance.

With the present invention, the air pressure profile can have various forms. In its simplest form, the pressure profile is constant, i.e., a single pressure is supplied to the tool during the complete sequence of final tightening of the lug. The supplied air pressure is determined based on an algorithm taking into account the wheel torque specifications, the tool specifications and the calibration coefficients $C_A$ and $C_T$.

Figure 2:
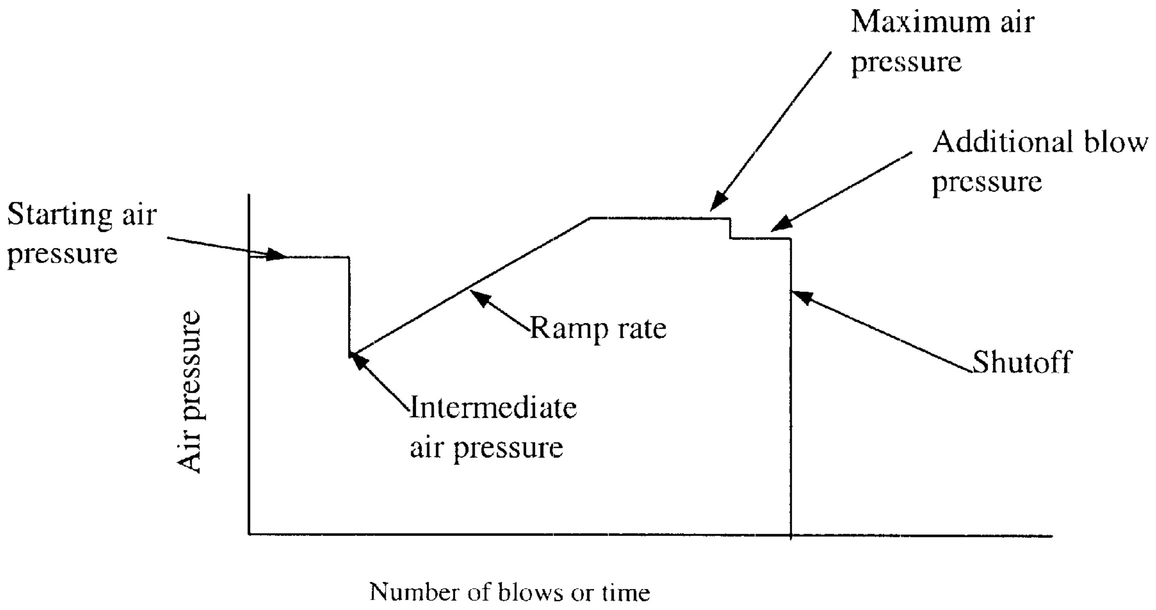
FIG. 2 is a graphic representation of the preferred air pressure profile.

In the preferred embodiment, a variable pressure profile, as illustrated in FIG. 2, is utilized during the final tightening of each lug to provide improved torque accuracy and error detection. As can be seen in FIG. 2, the preferred pressure curve has various segments including:

Maximum air pressure: Limiting the maximum air pressure supplied to the tool limits the maximum power and torque output of the tool. The magnitude of this parameter is adjusted based on the desired torque value.

Intermediate air pressure: An air pressure setting that is less than the maximum air pressure. Many automotive wheel designs have joint stiffness that vary greatly (e.g., between 0.7 ft lb/degrees to 3 ft-lb/degrees). Joints with a low joint stiffness (e.g., 0.7 ft-lb/degree) require higher maximum tightening pressure than a wheel that has a high joint stiffness (e.g., 3 ft-lb/degree). It is difficult, if not impossible, to identify a single maximum air pressure that will accurately tighten both types of joints. Starting the tightening process at an air pressure setting that is less than the expected maximum required to tighten a joint of low stiffness will prevent torque overshoot on a joint that has a high stiffness.

Ramp rate: The ramp rate is the slope of the air pressure line in going from the intermediate air pressure to the maximum air pressure. Accurate selection of the ramp rate helps prevent errors. If the ramp rate is too slow, the time required to achieve maximum air pressure and finish the tightening process can become excessive. On the other hand, if the ramp rate is too steep, the torque output of the tool may increase rapidly between blows resulting in a reduction in torque accuracy. For example, since it is possible to achieve the desired torque before the maximum air pressure is reached, a rapid increase in torque output may result in one blow being below the desired torque and then the very next, increased blow being past the desired torque, resulting in an over torque.

tool. These blows are delivered at an air pressure that is slightly lower than the air pressure reached at the time the target torque occurred. The additional blows are desirable because a joint of low stiffness has a greater tendency to relax than a joint of high stiffness. In addition the lack of stiffness in the joint impedes the ability of the tool to produce torque in the joint. The additional blows continue to add energy to the joint to compensate for the relaxation and torque limiting effect.

Air Pressure Curve Summary:

Each segment described above provides one or more benefits which may be utilized in a different pressure curve, for example, the additional blow air pressure may be utilized with a generally constant pressure profile. In the preferred embodiment, the components are implemented together to precisely control air pressure to the tool such that torque accuracy and the ability to identify a fastener that has been previously tightened are greatly improved. The precise value and percent difference between the transition points of segments of the air pressure profile are related to the inertia of the rotating parts of the discrete energy tool being used and the magnitude of the torque that is desired in the joint that is being tightened. The values of the air control parameters are determined through test iterations to achieve the desired results. The transition points of the air profile can be triggered either by time or number of blows. The optimal air pressure settings for each desired torque setting can be determined and recorded in a data table similar to Table 1. The data can then be coded into the control software of the DMS 110 or each individual TMS 106. Alternatively, an equation may be used such that consultation of a table is unnecessary.

TABLE 1

Example Air Pressure Profile Values For Final Tightening

| Target Torque (ft-lb) | Starting air pressure (psi) | Intermediate air pressure (psi) | Ramp rate (psi/blow) | Maximum air pressure (psi) | Additional blow air pressure (psi) | Additional number of blows | Fast error scaling factor |
|---|---|---|---|---|---|---|---|
| 55 | 75 | 40 | 1 | 100 | 80.00 | 2 | 1.00 |
| 56 | 75 | 40 | 1 | 100 | 80.25 | 2 | 1.00 |
| 70 | 80 | 40 | 1 | 100 | 83.75 | 2 | .97 |
| 71 | 80 | 41 | 1 | 100 | 84.00 | 2 | .97 |
| 72 | 81 | 42 | 1 | 100 | 84.25 | 2 | .97 |
| 73 | 81 | 43 | 1 | 100 | 84.50 | 2 | .97 |
| 74 | 81 | 44 | 1 | 100 | 84.75 | 2 | .96 |
| 99 | 90 | 72 | 1 | 100 | 91.00 | 2 | .92 |
| 100 | 90 | 73 | 1 | 100 | 91.25 | 2 | .92 |

Starting air pressure: As explained above, it is desirable to start the tightening at an intermediate air pressure that is less than the maximum air pressure. However, reducing the air pressure from a constant maximum level to an intermediate level may make it more difficult for the system to identify a fastener that has previously been tightened as explained below. Increasing the starting air pressure to a level that is higher than the intermediate pressure for a limited time can improve the ability of the control system to recognize a symptomatic condition that is consistent with a fastener that has previously been tightened without adversely affecting the torque accuracy of the system.

Additional blow air pressure: When tightening joints with low stiffness (e.g., 0.7 ft-lb/deg), it is sometimes desirable to allow the tool to deliver additional blows to the joint after the target torque has been detected on the output shaft of the An example of the increased ability to detect a fastener that has already been fastened by utilizing a higher starting air pressure is set forth below. This feature ensures that if an operator mistakenly retightens a fastener that has already been tightened, the system detects the retightening and sends an alert.

FIGS. 3–6 are plots from a data acquisition system. Each figure contains two data signals: channel 0, which is torque, and channel 1, which is air pressure at the tool inlet. The torque signal is recorded from the torque transducer located on the output shaft of the tool. Each peak in the torque signal correlates to an impact of the pulse mechanism. The air pressure signal is recorded from a pressure transducer located at the inlet of the tool.

Figure 3:
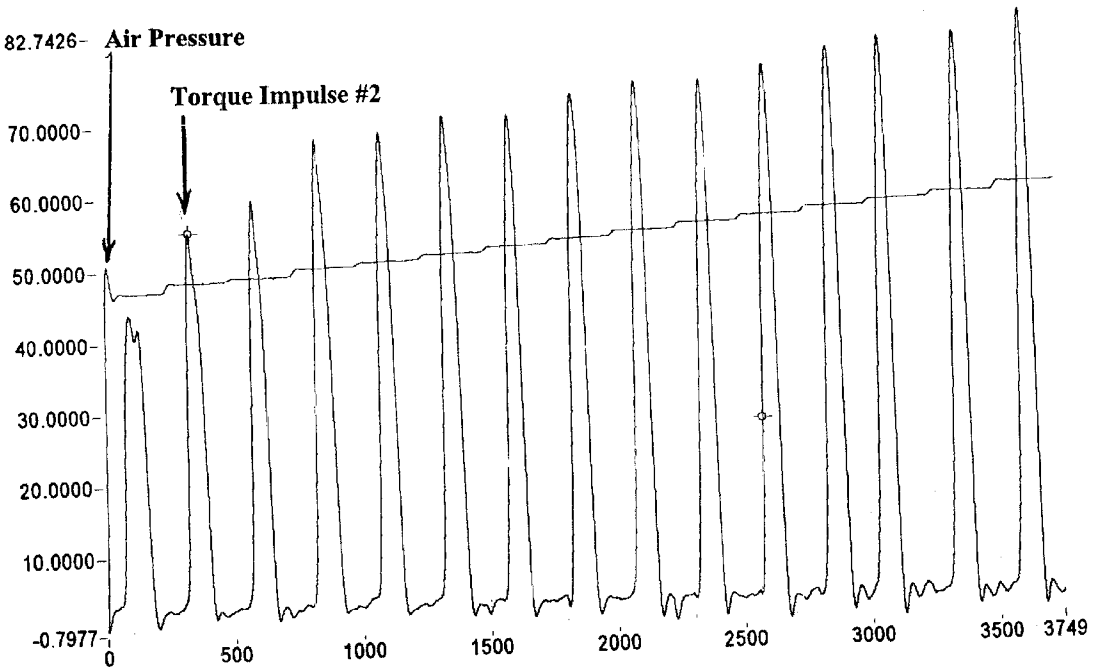
FIGS. 3–6 are data acquisition plots corresponding to tightening traces for fasteners at various pressures and conditions.
Figure 4:
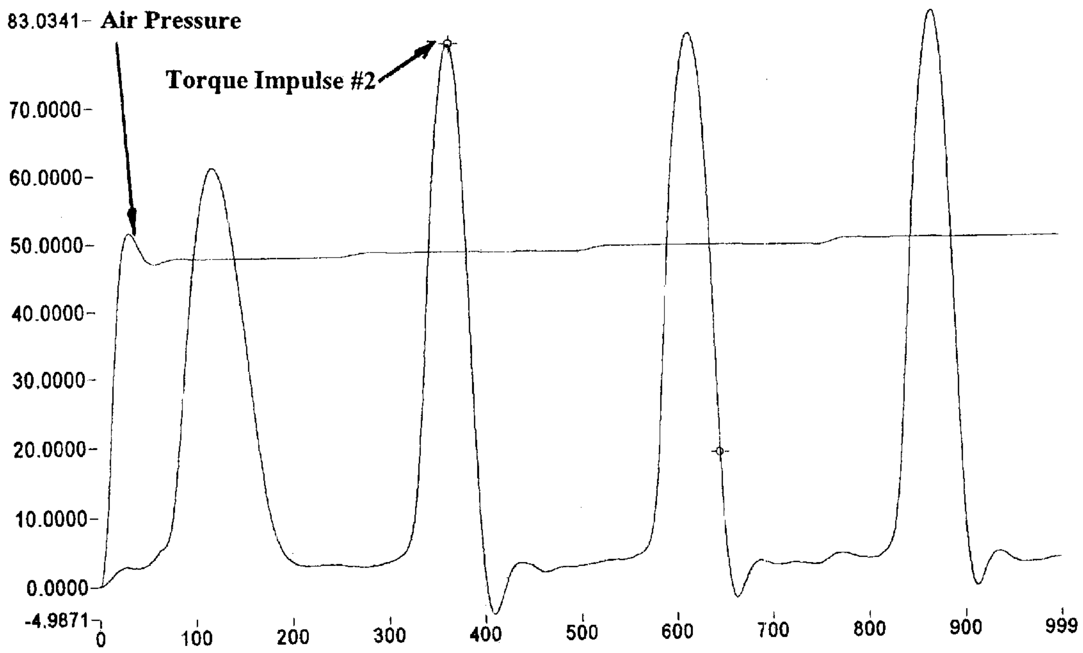

FIG. 3 is a tightening trace completed on a loose bolt with a low starting air pressure (50 psi). As shown on the plot, the magnitude of the second torque impulse is approximately 55 ft-lb. FIG. 4 is a tightening trace completed on the bolt that was previously tightened in FIG. 3. The tightening process for FIG. 4 also started at a low initial pressure (50 psi). The magnitude of the second torque impulse is 78 ft-lb.

Figure 5:
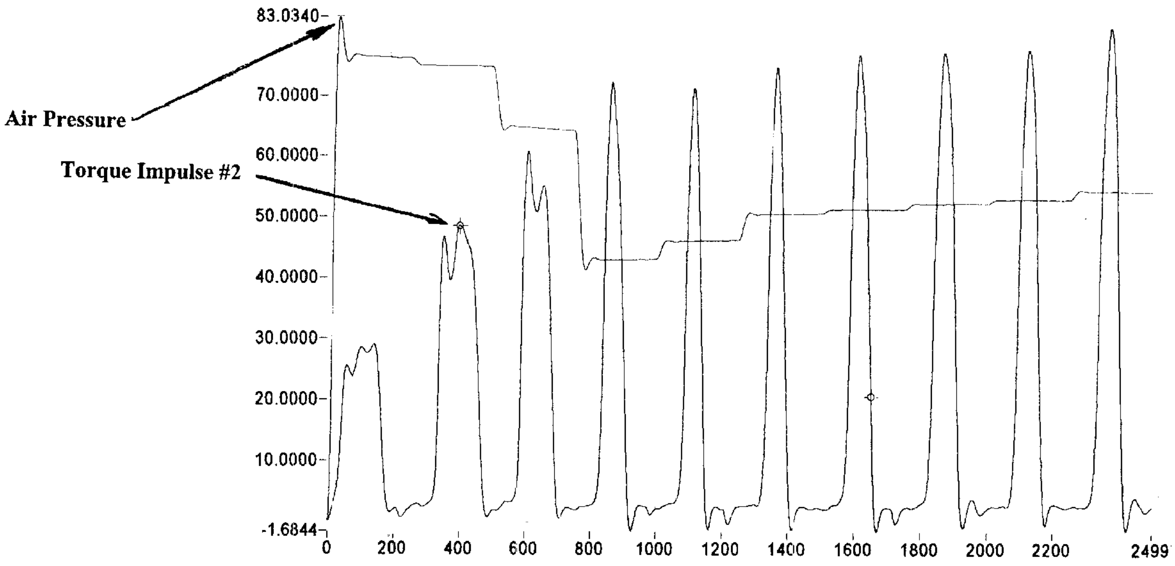
Figure 6:
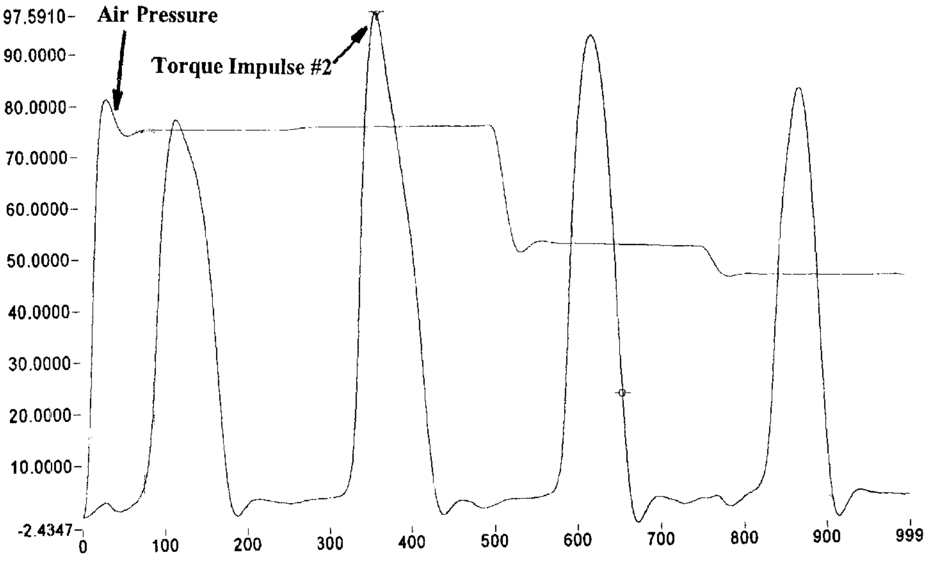

FIG. 5 shows a tightening trace completed on a loose bolt with a high initial air pressure (83 psi). As shown on the plot, the magnitude of the second torque impulse is approximately 48 ft-lb. Comparing FIGS. 3 and 5, it can be seen that although the starting air pressure in FIG. 5 is significantly higher than the starting air pressure in FIG. 3, the magnitude of the second torque impulse on both plots are very similar. This is true because when a bolt begins the process untightened or tightened to a low torque (snugged), much of the energy delivered by the pulse mechanism is used up turning the bolt through a large angle. As a result, the torque measured in the anvil is relatively low regardless of the starting pressure. The tightening process for FIG. 8 started at a high initial pressure (83 psi) and the bolt was previously tightened as shown in FIG. 5. The magnitude of the second torque impulse is 97 ft-lb. Comparing FIG. 4 and FIG. 6, it can be seen that increasing the initial air pressure from 50 to 83 psi results in an increase of almost 20 ft-lb in the magnitude of the second torque impulse. Examining the results of the four tests, it can be seen that increasing the starting air pressure does not effect the magnitude of the second torque impulse if the joint has not been tightened previously, however, if the joint is starting from a tightened condition, the difference in the magnitude of the second torque impulse is significant. A torque level threshold can be set in the system controller to determine if the magnitude of the second torque impulse is above a predetermined level, for example, 90% or more of the target torque. If the magnitude of the second torque impulse exceeds the predetermined level, the system will consider the joint previously tightened and an error signal will be generated. The calibration factors $C_A$ and $C_T$ are preferably utilized in the establishment of the predetermined level. The use of $C_A$ and $C_T$ and the associated target shift, which results in a better selection from the air pressure profile matrix for the tool and conditions during actual tightening, greatly enhances the selectivity when determining if the joint has been previously tightened. This is apparent when considering the case of a first tool that is generating torque pulses that are towards the low end of the acceptable output in comparison with a second tool that is generating pulses that are towards the high end of the acceptable output. Distinguishing between the second blow of the first tool on a previously tightened fastener and the second blow of the second tool on a fastener that had only been tightened to a snug torque is clearly more difficult without the use of the calibration coefficient $C_A$. The same explanation applies to the advantages of using $C_T$ when temperature is the factor driving the performance difference between two tools. The use of both $C_A$ and $C_T$ provides even better selectivity.

Many elements of the present invention may be embodied in the form of computer-implemented processes and apparatus for practicing those processes. These elements may also be embodied in the form of computer program code embodied in tangible media, such as floppy diskettes, read only memories (ROMs), CD-ROMs, hard drives, high density disks, tape, or any other computer-readable storage medium, wherein, when the computer program code is loaded into and executed by a computer, the computer becomes an apparatus for practicing the invention. These elements of the present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a processor, the processor becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. A method of controlling an air driven tool to provide a desired torque to a fastener, the method comprising:

establishing an air pressure profile for a plurality of torque values;

determining a calibration factor for the tool including measuring a temperature of the tool;

establishing an expected torque value ($T_{EXP}$) based on the tool temperature;

accessing a nominal torque value ($T_{NOM}$) for the tool which was established by applying a standard tool to a calibration joint at a nominal air pressure ($P_{NOM}$) and a nominal temperature ($Temp_{NOM}$); and calculating a temperature calibration factor ($C_T$) by dividing the nominal torque value ($T_{NOM}$) by the expected torque value ($T_{EXP}$);

multiplying the desired torque by the calibration factor to determine a calibrated torque value; and supplying the tool with air at the air pressure profile corresponding to the calibrated torque value.

2. The method of claim 1 wherein the temperature of the tool is measured at a given interval and averaged over a given amount of time.

3. The method of claim 2 wherein the given interval is equal to 5 minutes and the given amount of time is equal to 30 minutes.

4. A method of controlling an air driven tool to provide a desired torque to a fastener, the method comprising:

establishing an air pressure profile for a plurality of torque values;

determining a calibration factor for the tool including measuring a temperature of the tool;

establishing an expected torque value ($T_{EXP}$) based on the tool temperature;

measuring a measured torque value ($T_{MEA}$) for the tool by applying the tool to a calibration joint at a nominal air pressure ($P_{NOM}$); and calculating a tool age calibration factor ($C_A$) by dividing the expected torque value ($T_{EXP}$) by the measured torque value ($T_{MEA}$);

multiplying the desired torque by the calibration factor to determine a calibrated torque value; and supplying the tool with air at the air pressure profile corresponding to the calibrated torque value.

5. The method of claim 4 wherein measuring the measured torque value ($T_{MEA}$) includes measuring peak values of torque blows for a fixed time or a fixed number of blows and averaging the measured peak values.

6. The method of claim 5 wherein measuring peak values includes filtering the measured peak values to attenuate signals above a corner frequency.

7. The method of claim 4 further comprising automatically setting the air supply pressure to a value equal to the nominal air pressure ($P_{NOM}$) prior to application of the tool to the calibration joint.

8. A method of controlling an air driven tool to provide a desired torque to a fastener, the method comprising:

establishing an air pressure profile for a plurality of torque values;

determining a calibration factor for the tool including measuring a temperature of the tool;

establishing an expected torque value ($T_{EXP}$) based on the tool temperature;

accessing a nominal torque value ($T_{NOM}$) for the tool which was established by applying a lab standard tool to a calibration joint at a nominal air pressure ($P_{NOM}$);

measuring a measured torque value ($T_{MEA}$) for the tool by applying the tool to the calibration joint at the nominal air pressure ($P_{NOM}$);

calculating a temperature calibration factor ($C_T$) by dividing the nominal torque value ($T_{NOM}$) by the expected torque value ($T_{EXP}$);

calculating a tool age calibration factor ($C_A$) by dividing the expected torque value ($T_{EXP}$) by the measured torque value ($T_{MEA}$); and calculating a total calibration factor by multiplying the temperature calibration factor ($C_T$) by the tool age calibration factor ($C_A$);

multiplying the desired torque by the calibration factor to determine a calibrated torque value; and supplying the tool with air at the air pressure profile corresponding to the calibrated torque value.

9. The method of claim 8 wherein the expected torque value ($T_{EXP}$) is calculated using the formula:

$$T_{EXP}=A_0+A_1{*}\text{ temperature}+A_2{*}\text{ temperature}^2+A_3{*}\text{ temperature}^3$$

wherein temperature is equal to a current or averaged temperature value and the A's are coefficients established using laboratory data relating to measured values under standard conditions.

10. The method of claim 9 wherein the coefficients are found by using a least squares fit to the laboratory data.

11. The method of claim 9 wherein the coefficients, using a lab standard tool manufactured by Yokota Industries under model no. YEX-1900 at a $P_{NOM}$ of 70 psi with a resultant $T_{NOM}$ of 108.6 ft. lbs., have the following values:

$A_0$=6.766E1

$A_1$=1.537E0

$A_2$=−1.813E−2

$A_3$=6.462E−5.

12. The method of claim 8 further comprising storing the nominal torque value ($T_{NOM}$), the nominal air pressure ($P_{NOM}$) and the coefficients in an associated control system.

13. A method of controlling an air driven tool to provide a desired torque to a fastener, the method comprising:

establishing an air pressure profile for a plurality of torque values;

determining a calibration factor for the tool including measuring a temperature of the tool; and establishing an expected torque value ($T_{EXP}$) based on the tool temperature, said torque value ($T_{EXP}$) being calculated using the formula:

$$T_{EXP}A_0+A_1{*}\text{ temperature}+A_3{*}\text{ temperature}^3$$

wherein temperature is equal to a current or averaged temperature value and the A's are coefficients established using laboratory data relating to measured values under standard conditions;

multiplying the desired torque by the calibration factor to determine a calibrated torque value; and supplying the tool with air at the air pressure profile corresponding to the calibrated torque value.

14. A method of controlling an air driven tool to provide a desired torque to a fastener, the method comprising:

establishing a maximum air pressure value;

supplying the tool with air at a starting air pressure value greater than an intermediate air pressure value and less than or equal to the maximum air pressure value for a limited time prior to supplying of air beginning at the intermediate air pressure value;

measuring a torque value at the limited time;

comparing the measured torque value at the limited time with a limit torque having a predetermined value;

designating a pre-tightened condition if the measured torque value at the limited time is greater than or equal to the limit torque value; and if the measured torque value at the limited time is less than the limit torque value, supplying the tool with a continuous supply of air beginning at the intermediate air pressure value that is less than the maximum air pressure value and continuously increasing the air pressure at a desired rate until the torque applied to the fastener is within a predetermined range of the desired torque.

15. The method of claim 14 wherein the limit torque value is calculated as a percentage of the desired torque.

16. The method of claim 15 wherein the percentage is in a range of 91–100 percent.

17. The method of claim 14 wherein a calibration factor is utilized in establishing the predetermined value.

* * * * *

UNITED STATES PATENT AND TRADEMARK OFFICE

CERTIFICATE OF CORRECTION

PATENT NO. : 6,668,212 B2 Page 1 of 1
DATED : December 23, 2003
INVENTOR(S) : Louis J. Colangelo, III, Timothy R. Cooper and John L. Linehan It is certified that error appears in the above-identified patent and that said Letters Patent is hereby corrected as shown below:

Column 12,
Line 14, correct formula as follows:
-- $T_{EXP} = A_0 + A_1 * \text{temperature} + A_2 * \text{temperature}^2 + A_3 * \text{temperature}^3$ --

Signed and Sealed this

Sixteenth Day of March, 2004

JON W. DUDAS
*Acting Director of the United States Patent and Trademark Office*